United States Patent [19]
Kalnoki-Kis

[11] 3,902,922
[45] Sept. 2, 1975

[54] CONDUCTIVE COATED VENTED CATHODE COLLECTOR FOR THIN FLAT CELLS

[75] Inventor: Tibor Kalnoki-Kis, Westlake, Ohio

[73] Assignee: Union Carbide Corporation, New York, N.Y.

[22] Filed: July 18, 1974

[21] Appl. No.: 489,731

[52] U.S. Cl. ............................. 136/111; 136/177
[51] Int. Cl. ........................................ H01m 21/04
[58] Field of Search .......... 136/111, 107, 108, 177, 136/179, 163, 10, 175

[56] References Cited
UNITED STATES PATENTS

| | | |
|---|---|---|
| 2,762,858 | 9/1956 | Wood .............................. 136/111 X |
| 3,489,616 | 1/1970 | Fangradt et al ..................... 136/107 |
| 3,563,805 | 2/1971 | Deierhoi, Jr. ....................... 136/111 |
| 3,607,430 | 9/1971 | Glover ............................... 136/111 |
| 3,741,813 | 6/1973 | Bergum et al. ..................... 136/107 |

Primary Examiner—Anthony Skapars
Attorney, Agent, or Firm—C. F. O'Brien

[57] ABSTRACT

A thin flat cell employing a metal anode (zinc), a cathode (manganese dioxide), an electrolyte (ammonium chloride) and a perforated cathode collector (steel); said cathode collector being coated with a continuous layer of a gas-permeable, electrolyte-impermeable polymeric material which allows the venting of undesirable gases formed within the cell while preventing any electrolyte loss from said cell.

15 Claims, 4 Drawing Figures

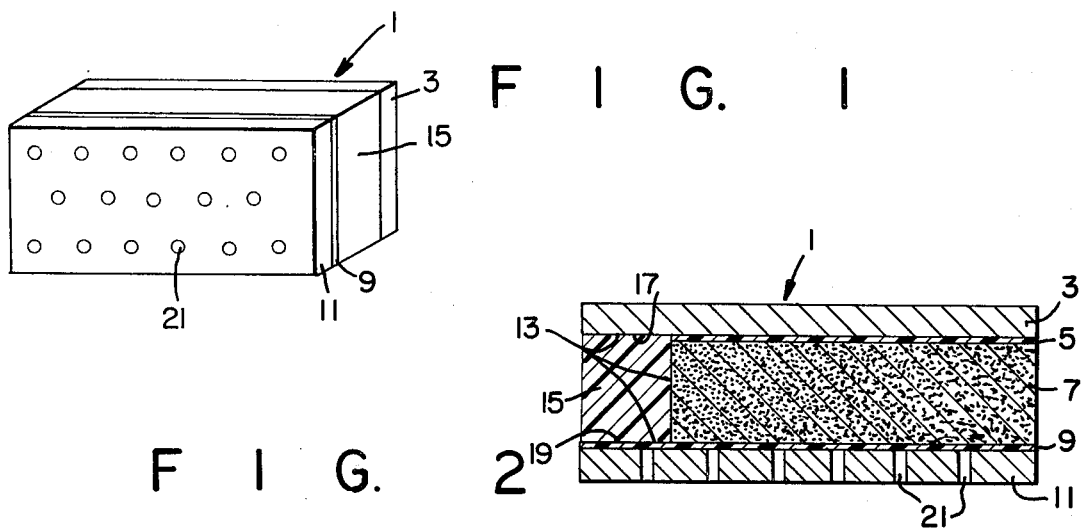
FIG. 1
FIG. 2
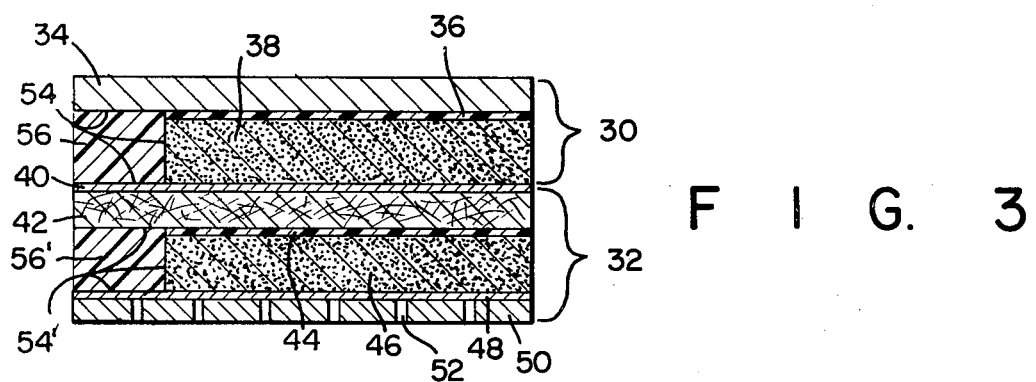
FIG. 3
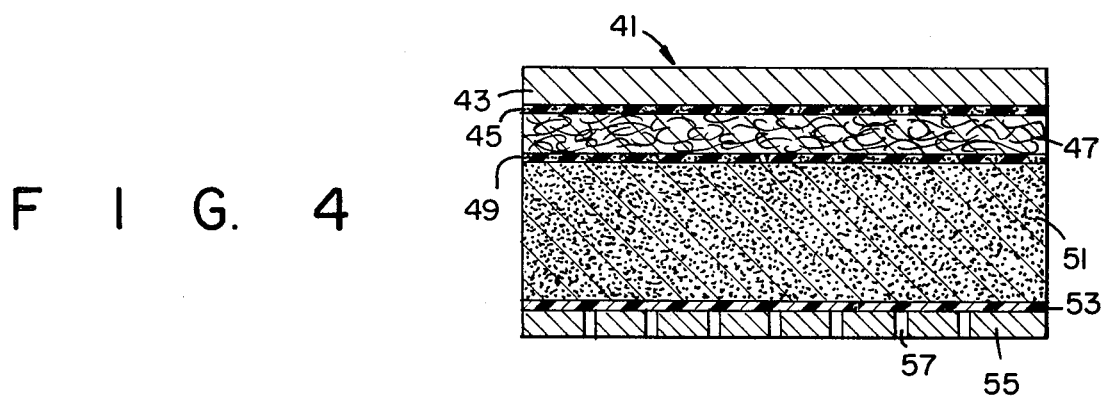
FIG. 4

CONDUCTIVE COATED VENTED CATHODE COLLECTOR FOR THIN FLAT CELLS

FIELD OF THE INVENTION

This invention relates to an improved construction for thin flat cells or batteries and particularly to thin flat cells or batteries employing a vented cathode collector.

DESCRIPTION OF THE PRIOR ART

The continuing development of portable electrically powered devices of compact design such as tape recorders and playback machines, radio transmitters and receivers, shavers, watches, and motion picture or still cameras creates a continuing demand for the development of reliable, compact batteries for their operation. The power needs of such devices are varied. Thus, a watch requires a battery which will perform uniformly for at least a year at low drain; recorders and radios require batteries which will operate intermittently for perhaps a half hour to several hours at substantially higher drains followed by longer periods of non use. A motion picture camera in which a battery may operate exposure control means as well as drive a motor usually requires the battery to operate in a repetitive series of relatively short periods of time in a given day, but may not be used for weeks or months. A still camera in which a battery may be used to fire a flash bulb and in some cases to control exposure means and advance the film after each exposure requires the battery to deliver a series of pulses of rather high current, frequently in rapid succession.

While the battery industry has been quite successful in providing batteries to satisfy these diverse demands, the vast majority of the batteries produced for and used in devices of the type discussed are cylindrical. They may range in height from the familiar "button" cells to as much as one-half inch to one inch or even more and in diameter from roughly about one-half inch to one inch or more. Although they are excellent sources of electricity, their shape has limited to some extent the size and shape of the devices for which they are intended. As design concepts change there is increasing emphasis placed on thin, flat shapes. Devices of thin, flat shape cannot be made to accommodate the familiar cylindrical battery without devoting more space to the battery than is desired. Accordingly, there is an increasing demand for thin, flat batteries.

The problem associated with maintaining good electrical contact between cell elements is particularly notable in thin flat cell constructions where external supports are generally impractical since such members may be many times the thickness of the cell itself. In addition, since such flat cells possess a large unsupported surface, the usual means employed for maintaining cell integrity along the periphery of the cell may not be sufficient to maintain good electrical contact between cell elements at the center of the flat cell because of the formation of gases within the cell which has a tendency to separate the cell components thereby increasing the resistance of the cell to a degree that the cell could become inoperative for its intended use.

It has previously been suggested in the prior flat cell art that adhesives be used in assembling specific cell components, for example, between cathode and cathode collector, between collector and the outer envelope, and between cells in a stack. These bonding techniques are set forth in detail in U.S. Pat. Nos. 2,870,235 to Soltis, 3,379,574 to Grulke, et al., 2,762,858 to Wood, 3,223,555 to Solomon, et al., 2,658,098 to Coleman, et al., and 2,487,985 to Ruben. The adhesives described in these patents have been suitable for use only in a limited portion of the cell and could not be used to maintain the entire cell structure as an integral unit. For example, none of the adhesives previously suggested has been entirely suitable for use in providing permanent adhesion to the corroding face of the cell anode. In this connection, it is well known that during discharge of the cell, the anode metal is consumed, and if consumed in a non-uniform manner, physical voids could occur on and in the anode surface. Proper wetting of the anode surface by the adhesive must be maintained for the adhesive to be effective.

U.S. Pat. No. 3,563,805 to Deierhoi, Jr. discloses a flat cell having an anode, a cathode, a separator, an immobilized adhesive electrolyte and a cathode collector, all of which are appropriately arranged and adhesively secured together by a conventional sealing means which effectively maintains a relatively low electrical resistance contact between all the individual cell components.

In U.S. Pat. No. 3,617,387 to Grulke, et al., a flat cell is disclosed which has all its components completely internally bonded together with a polymeric adhesive, said adhesive maintaining physical and electrical contact between the components.

Another approach to produce a flat multicell battery is disclosed in U.S. Pat. Nos. 3,770,504 to Bergum, et al., and 3,770,505 to Bergum, wherein the confronting faces of each adjacent pair of conductive layers forming the battery are adhered and electrically bonded one to the other. In addition, adjacent cells of the battery are electrically connected one to the other by means of an electrolyte impervious intercell connector layer which extends beyond the electrodes of the cells so that the peripheral faces of the intercell connector layers can be suitably sealed to provide a liquid impervious seal around each cell.

Although all of the above approaches work to some degree in producing a flat cell, a buildup of undesirable gas pressure generally occurs within a cell during shelf storage or during discharging which could be sufficient to separate two or more of the cell's components thereby greatly increasing the internal resistance of the cell to a point where the cell becomes ineffective for its intended use.

Copending patent application Ser. No. 489,843 filed July 18, 1974, by T. Kalnoki-Kis and T. A. Reilly, discloses another approach to producing a thin, flat cell or battery wherein the anode of the cell is perforated for the purpose of venting undesirable gases formed during storage and discharge of the cell or battery. This patent application also discloses an embodiment wherein the anode and the cathode collector are both perforated for venting undesirable gases found within the cell or battery.

It is an object of the present invention to provide a thin, flat cell or battery having novel means for venting undesirable gas formed within the cell so as to effectively minimize any gas pressure buildup within the cell.

Another object of the present invention is to provide a thin, flat cell or battery having a perforated cathode collector which is coated on at least one side with a continuous layer of a gas-permeable, electrolyte-impermeable conducting adhesive or paint.

Another object of the present invention is to provide a thin, flat cell or battery having good ionic and/or electronic conductivity at the interfaces of each of the cell's components throughout storage and discharge of the cell.

SUMMARY OF THE INVENTION

The invention relates to a thin, flat cell having a metal anode; a cathode of depolarizer mix; an electrolyte permeable separator between said anode and said cathode; an electrolyte in contact with said anode and said cathode; and a cathode collector; said cathode collector having a plurality of openings for venting undesirable gases formed in the cell and said cathode collector having on at least one of its surfaces a substantially continuous layer of a gas-permeable, electrolyte-impermeable conductive paint; and wherein said cathode, said separator, and said electrolyte are bounded by a peripheral frame of electrolyte impervious sealing material, said frame being bonded to at least a portion of the inner marginal faces of the anode and the coated cathode collector which extends beyond the area defined by said cathode, said separator and said electrolyte.

The invention also relates to a thin, flat cell having a metal anode; a cathode of depolarizer mix; an electrolyte permeable separator between said anode and said cathode; an electrolyte in contact with said anode and said cathode; and a cathode collector; said cathode collector having a plurality of openings for venting undesirable gases in the cell and said cathode collector having on at least one of its surfaces a substantially continuous layer of a gas-permeable, electrolyte-impermeable conductive paint; and wherein all of said components of said cell are substantially adhesively secured together so as to maintain a relatively low electrical resistance contact between said individual cell components.

As used herein, a substantially continuous layer shall mean at least a layer that effectively covers the openings on the surface of the cathode collector, and when the material of the cathode collector is such that it would be subject to excessive corrosion in a cell environment, then at least the surface of the cathode collector subject to such corrosion will be substantially covered with the layer.

Preferably, the paint for the cell's cathode collector has to be a gas-permeable, electrolyte-impermeable conductive paint, as for example, disclosed in U.S. Pat. Nos. 2,759,038, 2,745,774, 2,834,826, 3,072,558, 3,353,999, 3,343,995, 3,510,448, 3,563,851, 3,547,771 and 3,575,905. An additional paint or adhesive for use in this invention could comprise a solution of a copolymer of vinyl chloride and vinyl acetate in an organic solvent containing a suitable stabilizer for high temperature conditions and a plasticizer for flexibility.

In one embodiment of this invention, the cell's separator, electrolyte and cathode of depolarizer mix are bounded at one end by a metal anode and at the other end by a metallic cathode collector, said anode and cathode collector extending beyond the area defined by the cathode, separator and electrolyte thereby forming a peripheral recess between the marginal inner faces of said anode and said cathode collector into which a frame of electrolyte impervious sealing material is deposited. In this type cell construction, any gases formed during storage or during discharge of the cell will have a tendency to separate the components of the cell; i.e., the cathode collector from the cathode, or the separator from the anode, which will have the effect of increasing the internal resistance of the cell to a degree that the cell may become inoperative for its intended use. According to this invention, a plurality of openings are placed in the cathode collector for venting any undesirable gases formed within the cell. In addition to perforating the cathode collector, a gas-permeable, electrolyte-impermeable conductive coating is deposited on at least one side of the cathode collector, preferably the side contacting the cathode component of the cell, so as to prevent the loss of any electrolyte through the openings in the cathode collector while allowing for the escape of undesirable gases. By having the combination of a perforated cathode collector and a layer of a gas-permeable, electrolyte-impermeable conductive coating on said cathode collector, the bonding strength provided by the peripheral frame of electrolyte impervious sealing material will be sufficient to maintain the physical and electrical contact between adjacent cell components during cell storage and discharge since any gases formed within the cell will be able to escape through the openings in the cathode collector. Thus according to this invention, all components of the cell are secured in intimate contact, and no external pressure-exerting means need be employed. The frame of sealing material surrounding the cathode, separator and electrolyte, aids to rigidify the cell and in maintaining low electrical resistance contacts between the cell components in cooperation with the metal anode and the cathode collector to which the frame of sealing material is marginally sealed.

The size of the opening in the cathode collector can vary between about 10 microns in diameter and about 250 microns in diameter, preferably between about 75 microns in diameter and about 175 microns in diameter. Openings larger than 250 microns in diameter will be unsuitable because of the tendency of the gas-permeable, electrolyte-impermeable conductive adhesive to shrink and crack on drying, thereby providing openings through which the electrolyte can escape. Openings smaller than 10 microns in diameter will be unsuitable because the particles of the conductive material may be sufficiently large enough to plug or substantially plug the openings thereby preventing the effective venting of the gases formed within the cell. In addition, it would be difficult using conventional perforating means to form openings smaller than about 10 microns.

The opening instead of being circular can be square, rectangular or any shape as long as the size of the opening is between about 78 square microns and about 65,000 square microns ($\sim 0.0006$ cm$^2$), preferably between about 4,200 square microns ($\sim 0.00004$ cm$^2$) and about 25,000 square microns ($\sim 0.00025$ cm$^2$). In some instances, it may be feasible and advantageous to impart slits in the cathode collector with any sharp instrument, such slits being at least about 0.0025 centimeter, preferably about 0.0075 centimeter, in width and up to about 1.0 centimeter in length.

The number of openings in the cathode collector can vary depending on such features as the cell system and the porosity of the cathode mix. However, a minimum of at least one opening every three square centimeters of the cathode collector is necessary if the gases formed within the cell are to escape without disrupting the contact between the cell components. The maximum number of openings in the cathode collector would be limited to the number whereby the cathode collector would effectively lose its conductive characteristics and/or integrity and strength required to maintain the cell as a structural power unit. Preferably, the openings should be uniformly disposed throughout the cathode collector and, where not uniformly disposed, the openings should be disposed at or near the center of the cathode collector where mechanical support is at a minimum.

It is apparent that if a rather dense, low porosity cathode mix is used in the cell, then the number of openings in the cathode collector would have to be rather large to insure that any gas reaching the interface of the cathode mix and coated cathode collector will have an opening disposed in the cathode collector through which it can escape. On the other hand, when a rather porous cathode mix is employed, then the number of openings required would not be great since any gas reaching the interface of the cathode mix and the coated cathode collector could easily circulate to an opening and escape therefrom.

When employing a rather dense cathode mix, the mix may be scored, perforated or suitably divided so as to provide adequate gas channels or passages within the mix leading to the interface of the cathode mix and the coated cathode collector.

Another embodiment of this invention would be similar to the above-described cell construction except that the anode and cathode collector would not extend beyond, but would be coextensive with, the area defined by the separator, electrolyte and cathode mix. In addition, all the cell components would be adhesively secured together as disclosed, for example, in U.S. Pat. Nos. 3,563,805 and 3,617,387. The additional requirement that the adhesive means employed to secure the cell components together be gas-permeable is necessary so as to allow any gas formed within the cell to circulate to the openings in the cathode collector. In this embodiment, all of the components of the cell are substantially adhesively secured in intimate contact so that no external pressure-exerting means is necessary.

Another embodiment of this invention would be a multicell battery comprising an outer negative (anode) electrode; an outer positive (cathode) electrode; at least one duplex electrode between the outer positive electrode and the outer negative electrode; a separator and an electrolyte between each positive and negative electrode in the battery; and a cathode collector having a plurality of openings for venting undesirable gases formed within the battery and having on at least one of its surfaces a substantially continuous layer of a gas-permeable, electrolyte-impermeable conductive paint; said duplex electrode comprising a positive electrode bonded to a porous negative electrode via an electronically conductive layer of a gas-permeable, electrolyte-impermeable adhesive; and all of said components of said battery secured together so as to maintain a relatively low electrical resistance contact between said individual cell components.

The positive electrode, electrolyte and separator of each cell could be bounded by a peripheral frame of electrolyte-impervious sealing material which could also be marginally bonded to each negative electrode and the adjacent conductive layer of the duplex electrode or the cathode collector defining each such cell. Or, if desired, all of the components of the battery could be substantially adhesively secured together as disclosed in U.S. Pat. Nos. 3,563,805 and 3,617,387. If the latter construction is employed, then all the adhesive layers would have to be gas-permeable so as to permit any gases formed within the cell to circulate to the cathode collector where they could be vented.

There are many conductive adhesives or paints which have been used, or are suitable for use, in the battery industry for bonding cell components together or for providing a cell component with a conductive layer. Examples of conductive adhesives or paints suitable for use in this invention are set forth in U.S. Pat. Nos. 2,759,038, 2,745,774, 2,834,826, 3,072,558, 3,353,999, 3,343,995, 3,510,448, 3,575,905, 3,563,851 and 3,547,771.

Plasticizers, including those materials which function as both a plasticizer and as a stabilizer, should be added in a minor amount to a conductive adhesive or paint to obtain specific chemical and mechanical properties desirable for a particular application. For example, stabilizers are generally added to maintain chemical stability at high temperatures and in oxidizing environments. Plasticizers are generally added to impart viscoelastic properties to the formed film. In many cases, a single material will function both as a stabilizer and as a plasticizer when added to the copolymer of this adhesive or paint.

To render the adhesive or paint conductive, some electrically conductive particulate material, such as acetylene black, graphite or mixtures thereof, should be added. Preferably, a mixture having a ratio of 1 part by weight acetylene black to 3 parts by weight graphite would be suitable for most applications. For use on the cathode collector in accordance with this invention, the adhesive or paint would contain the conductive material.

BRIEF DESCRIPTION OF THE DRAWINGS

FIG. 1 is an isometric view of a cell made in accordance to this invention.

FIG. 2 illustrates a partial cross-section of a cell wherein the components of the cell are shown greatly magnified for purposes of illustration.

FIG. 3 illustrates a partial cross-section of a battery wherein the components of the cell are shown greatly magnified.

FIG. 4 is a cross-section of another embodiment of a cell wherein the components of the cell are shown greatly magnified.

Referring in more detail to the drawings, there is shown in FIGS. 1 and 2 a thin, flat cell 1 having an anode 3, electrolyte impregnated separator 5, cathode 7, conductive layer 9 and vented cathode collector 11. Electrolyte impregnated separator 5 and cathode 7 are contained within and bound by anode 3 and cathode collector 11 forming a peripheral recess 13 which is filled with a frame of sealing material 15 which marginally bounds cathode 7 and is secured to the inner marginal face 17 of anode 3 and the inner marginal face 19 of cathode collector 11 via the conductive layer 9. The adhesive used to form the frame must not react with the cell components or reaction products, should be electrolyte-proof and impermeable to water and vapor transfer, and should retain these properties and its adhesivity over the range of cell temperature operations. Suitable adhesives which can be used as the sealing material include the conventional vinyl adhesives or hot melt adhesives of vinyl-wax mixtures.

Cathode collector 11 is shown as having openings 21 for venting any undesirable gases formed within the cell during storage or discharge. The composition of conductive layer 9 is as described above and is characterized as being gas-permeable and electrolyte-impermeable. Thus any gases formed at the vicinity of the anode can travel through the cathode 7, conductive layer 9 and out through opening 21 in cathode collector 11. If desired, although not shown, a conductive tab, secured to anode 3 or an extension of anode 3, may be used as the anode terminal for specific applications such as when a non-conductive coating is applied to the outer surface of the anode.

To provide a battery of cells, it is necessary merely to place the anode of one cell in intimate electronic contact with the cathode collector of another thus effecting a series connection.

Generally, the surface contact pressure between the anode and the cathode collector of two adjacent superimposed cells required to provide good electronic contact therebetween will be insufficient to block venting from the cathode collector. However, if desired, additional horizontal venting passages may be disposed between said components of the adjacent cells.

An alternate construction for a series stack battery is one having a "duplex" electrode in which one surface of a metal anode is provided with an electronically conductive coating according to this invention and as shown in FIG. 3.

As seen in FIG. 3, two cells are arranged one above the other and adhesively secured together. The upper cell 30 comprises an anode 34, impregnated separator 36 and cathode 38. A conductive layer 40, as described above for layer 9, is disposed between, and bonded to, anode 42 and cathode 38. The lower cell 32 comprises a porous anode 42, such as powdered zinc, impregnated separator 44 and cathode 46. Disposed between cathode 46 and cathode collector 50 is conductive layer 48 which is identical to the conductive layer 9 of FIG. 2. The peripheral recesses 54 and 54' are filled with a sealing material 56 and 56', respectively, as described in conjunction with FIG. 2. Cathode collector 50 is shown as having openings 52 for venting gases formed within the cell during storage and discharge.

A requirement for this type battery construction is that conductive layers 40 and 48 be gas-permeable so as to permit the gases within the cell to circulate to the openings 52 in the cathode collector 50.

FIG. 4 shows another embodiment of a cell of this invention wherein all of the cell components are substantially adhesively secured together as disclosed, for example, in U.S. Pat. Nos. 3,563,805 and 3,617,387. Specifically, cell 41 comprises an anode 43, a first layer 45 of immobilized electrolyte, a separator 47, a second layer 49 of immobilized electrolyte, cathode 51, a conductive layer 53 and cathode collector 55 having openings 57. The layers 45 and 49 of immobilized electrolyte provide the electrolyte which is in ionic or electrolytic contact with the anode and cathode of the cell. The electrolyte in this embodiment can be a viscous, tacky or "sticky" mass which can be held within the bounds of the cell by having a suitable electrolyte-impermeable coating placed around the sides of the cell. This mass, in addition to providing the electrolyte of the cell, will serve to hold the cell components together.

The preferred embodiment of this invention would employ the LeClanche electrochemical system comprising manganese dioxide positive active material, zinc negative active material, preferably sheet zinc, and an electrolyte comprising ammonium chloride and/or zinc chloride. The cathode collector could be any conducting material such as steel, copper, zinc, nickel and nickel alloys, Grafoil* and the like, preferably steel because of its relatively low cost and good physical properties, such as strength. The perforated cathode collectors of this invention, i.e., cathode collectors having a plurality of openings, could be porous conductive substrates having pores within the range of the openings specified above. Examples of such materials are compressed metal wools, sintered metals and the like.

*Grafoil is a trademark for flexible graphite material of expanded graphite particles compressed together. Grafoil is manufactured by Union Carbide Corporation, New York, N.Y. and is the subject matter of U.S. Pat. No. 3,404,061.

Although the preferred electrochemical system is LeClanche, there are a wide variety of electrochemical systems that can be used in this invention. Among the positive electrode materials that are suitable for use in this invention are such materials as manganese dioxide, lead dioxide, nickel oxyhydroxide, mercuric oxide, silver oxide, inorganic metal halides such as silver chloride and lead chloride, and organic materials which are capable of being reduced such as dinitrobenzene and azodicarbonamide compounds. Among the negative electrode materials that are suitable for use in this invention are zinc, zinc-clad steel, aluminum, lead, cadmium and iron. Suitable electrolytes are ammonium chloride and/or zinc chloride, various alkaline electrolytes such as the hydroxides of potassium, sodium and/or lithium, acidic electrolytes such as sulfuric or phosphoric acid, and non-aqueous electrolytes, said electrolytes being chosen to be compatible with the negative and positive electrodes. The electrolytes may be either gelled or liquid depending on the particular cell construction and the electrochemical system used. The separator may be made from a wide variety of materials including the fibrous and cellulosic materials which are conventional in battery construction as well as from woven or non-woven fibrous materials such as polyester, nylon, polyethylene and glass.

Preferred electrochemical systems for use in this invention are those in which the positive electrode comprises manganese dioxide, the negative electrode comprises metals such as zinc, zinc-clad steel or aluminum, and the electrolyte substantially comprises an acidic solution of inorganic salts. Another preferred electrochemical system is the alkaline manganese system in which the positive electrode comprises manganese dioxide, the negative electrode comprises zinc, and the electrolyte substantially comprises a solution of potassium hydroxide. Other aqueous electrolyte systems suitable for use with this invention are nickel-zinc, silver-zinc, mercury-zinc, mercury-cadmium and nickel-cadmium.

EXAMPLE

Thin flat LeClance cells, as shown in FIG. 2, were prepared using a positive electrode mix of manganese dioxide, graphite and acetylene black, a negative zinc sheet electrode, and an electrolyte of ammonium chloride and zinc chloride. A cellulosic separator was disposed between the zinc anode and cathode mix of each cell as shown in FIG. 2 and was saturated with the electrolyte of each cell. A vinyl gas-permeable, electrolyte impermeable conductive paint, comprising a solution of a copolymer of vinyl chloride and vinyl acetate in an organic solvent containing a plasticizer, an epoxy resin stabilizer and a conductive particulate material of acetylene black and graphite, was applied to one surface of a steel cathode collector plate having openings disposed therein. After the paint dried, the coated cathode collector was assembled with the other cell components, in a manner as shown in FIG. 2, and then a hot melt adhesive, obtained commercially as Swift Z-863 from the Swift Company, was deposited in the peripheral recess formed between the extending anode and cathode plates to produce a thin rectangular flat cell. Each cell measured 1.75 inches wide and 2.75 inches long with the active cathode mix component of each cell measuring 1.48 inches by 2.25 inches.

Each cell was then tested by being successively discharged across a 0.312 ohm load for 0.1 second, a 0.832 ohm load for 1.5 seconds and then across a 6.250 ohm load for 1.0 second. This cycle of discharge was repeated after a three-second rest period until the closed circuit voltage of the cell decreased to 1.08 volts. The data obtained from the cells are shown in Table 2.

TABLE 2

| Condition | Open Circuit Voltage (average) | No. of Cells* | No. of Cycles (average) |
| --- | --- | --- | --- |
| 25°C. (fresh) | 1.65 volts | 100 | 35 |
| 120°F. (2 weeks) | 1.6 volts | 3 | 26 |
| 140°F. (8 hours) | 1.6 volts | 5 | 16 |
| 32°F. (24 hours) | 1.65 volts | 3 | 5 |

*The average impedance of the cells was found to be between 2 and 2.5 ohms at 1-kHz.

It is thus shown by the above examples that using the teachings of this invention, flat cells can be constructed which can function under various temperature conditions to deliver a series of pulses of rather high current in rapid succession.

It is to be understood that other modifications and changes to the preferred embodiments of the invention herein shown and described can also be made without departing from the spirit and scope of the invention.

What is claimed is:

1. A thin, flat cell having a metal anode; a cathode of depolarizer mix; a separator between said anode and said cathode; an electrolyte in contact with said anode and said cathode; and a cathode collector; said cathode collector having a plurality of openings for venting undesirable gases formed within the cell and having on at least one of its surfaces a substantially continuous coated layer of a gas-permeable, electrolyte-impermeable conductive paint; and wherein said cathode, said separator and said electrolyte are within and bounded by a peripheral frame of electrolyte impermeable sealing material, said frame being marginally adhered to said anode and said coated cathode collector.

2. The cell of claim 1 wherein the openings in said cathode collector are sized between about 78 square microns and about 65,000 square microns.

3. The cell of claim 2 wherein the openings are sized between about 4,200 square microns and about 25,000 square microns.

4. The cell of claim 1 wherein said anode is zinc, said cathode comprises manganese dioxide, and said electrolyte comprises ammonium chloride.

5. The cell of claim 1 wherein said anode is zinc, said cathode comprises manganese dioxide, and said electrolyte comprises zinc chloride.

6. A multicell battery comprising an outer negative electrode; an outer positive electrode; at least one duplex electrode between the outer positive electrode and the outer negative electrode; a separator and an electrolyte between each positive and negative electrode; and a cathode collector having a plurality of openings for venting undesirable gases formed within the battery and having on at least one of its surfaces a substantially continuous layer of a gas-permeable, electrolyte-impermeable conductive paint; said duplex electrode comprising a positive electrode bonded to a porous negative electrode via an electronically conductive layer; and all of said components of said battery substantially secured together so as to maintain a relatively low electrical resistance contact between said individual cell components.

7. The battery of claim 6 wherein the openings in said cathode collector are sized between about 78 square microns and about 65,000 square microns.

8. The battery of claim 7 wherein the openings are sized between about 4,200 square microns and about 25,000 square microns.

9. The battery of claim 6 wherein each anode is zinc, each cathode comprises manganese dioxide, and each electrolyte comprises ammonium chloride.

10. The battery of claim 6 wherein each anode is zinc, each cathode comprises manganese dioxide, and each electrolyte comprises zinc chloride.

11. A thin flat cell having a sheet metal anode; a cathode of depolarizer mix; a separator between said anode and said cathode; an electrolyte in contact with said anode and said cathode; and a cathode collector; said cathode collector having a plurality of openings for venting undesirable gases formed within the cell and having on at least one of its surfaces a substantially continuous layer of a gas-permeable, electrolyte-impermeable conductive paint; and wherein all of said components of said cell are substantially secured together so as to maintain a relatively low electrical resistance contact between said individual cell components.

12. The cell of claim 11 wherein the openings in said cathode collector are sized between about 78 square microns and about 65,000 square microns.

13. The cell of claim 12 wherein the openings are sized between about 4,200 square microns and about 25,000 square microns.

14. The cell of claim 11 wherein said anode is zinc, said cathode comprises manganese dioxide, and said electrolyte comprises ammonium chloride.

15. The cell of claim 11 wherein said anode is zinc, said cathode comprises manganese dioxide, and said electrolyte comprises zinc chloride.

* * * * *

Notice of Adverse Decision in Interference

In Interference No. 99,858, involving Patent No. 3,902,922, T. K. Kis, CONDUCTIVE COATED VENTED CATHODE COLLECTOR FOR THIN FLAT CELLS, final judgment adverse to the patentee was rendered Mar. 4, 1982, as to claims 1, 4, 5, 6, 9, 10, 11, 14 and 15.

[*Official Gazette August 17, 1982.*]